United States Patent [19]

Ranjan et al.

[11] Patent Number: 5,406,438
[45] Date of Patent: Apr. 11, 1995

[54] APPARATUS FOR TRIGGERING CHEMICALLY AUGMENTED ELECTRICAL FUSES

[75] Inventors: Radhakrishnan Ranjan, Hickory; William E. Lazenby, Statesville, both of N.C.; Robert E. Koch, Pittsfield, Mass.; Gerald J. Carlson, Scotia, N.Y.; John G. Leach; Ronald E. Bennet, both of Hickory, N.C.

[73] Assignee: General Electric Company, Schenectady, N.Y.

[21] Appl. No.: 248,470

[22] Filed: May 24, 1994

Related U.S. Application Data

[63] Continuation of Ser. No. 821,175, Jan. 15, 1992, abandoned.

[51] Int. Cl.[6] .............................................. H01H 37/76
[52] U.S. Cl. .................................... 361/104; 361/93; 361/103
[58] Field of Search ............... 361/103, 104, 106, 93, 361/58, 125, 115; 337/30, 4, 401, 160, 406, 142; 340/638, 644

[56] References Cited

U.S. PATENT DOCUMENTS

| | | | |
|---|---|---|---|
| 3,958,206 | 5/1976 | Klint | 337/406 |
| 4,176,385 | 11/1979 | Dethlefsen | 361/58 |
| 4,486,734 | 12/1984 | Leach | 337/162 |
| 4,489,301 | 12/1984 | Johnson et al. | 337/401 |
| 4,573,032 | 2/1986 | Hickey | 337/162 |
| 4,604,613 | 8/1986 | Clark | 340/638 |
| 4,638,283 | 1/1987 | Friend et al. | 337/162 |
| 4,807,082 | 2/1989 | Ranjan et al. | 361/104 |
| 4,920,446 | 4/1990 | Pflanz | 361/93 |

FOREIGN PATENT DOCUMENTS 1240035 7/1971 United Kingdom .......... H02H 3/08

*Primary Examiner*—Marc S. Hoff
*Assistant Examiner*—S. Jackson
*Attorney, Agent, or Firm*—Henry J. Policinski; William H. Murray

[57] ABSTRACT

An apparatus for triggering chemical augmented electrical fuses includes a light source which emits a light signal in the form of visible or infrared light energy upon receiving a signal from a control system, trigger signal source or other fuses. The light signal is coupled to a light detector by an optical coupling device such as a fiber optic cable. Upon receipt of the light signal, the light detector generates a signal which causes the application of electrical energy to exothermic material in a fuse, thereby detonating the material and causing interruption of current through the triggered fuse.

38 Claims, 5 Drawing Sheets

APPARATUS FOR TRIGGERING CHEMICALLY AUGMENTED ELECTRICAL FUSES

This is a continuation of application Ser. No. 07/821,175, filed on Jan. 15, 1992, now abandoned.

BACKGROUND OF THE INVENTION

This invention relates to current limiting fuses for use in electrical power distribution systems and particularly to chemically augmented fuses.

Electrical fuses provide a relatively inexpensive means of current interruption in a large variety of applications. For example, fuses can be utilized in multiphase electrical power distribution systems to interrupt current on the occurrence of a fault. Interruption of current protects the transmission lines as well as the equipment connected thereto.

It is desired that current interruption devices operate for a variety of abnormal conditions, such as, for example, hot oil in a transformer, high pressure inside a transformer tank, or the failure of a secondary protective device such as a circuit breaker or other fuse. In multiphase electrical power transmission systems, it is desirable that current is interrupted in all three phases upon the occurrence of a fault in a single one of the phases. This prevents "single phasing" of connected equipment and the associated risk of damage. It is also desirable that an external signal, derived for example from a secondary protection relay scheme, be capable of causing a fuse to operate and interrupt a circuit containing one or more fuses independent of the current flowing through the fuses.

SUMMARY OF THE INVENTION

It is therefore an object of the present invention to provide an apparatus for triggering a fuse independent of the current flowing through the fuse.

It is another object of the present invention to provide an apparatus for triggering a chemically augmented electrical fuse independent of the current flowing through the fuse.

It is still another object of the present invention to provide an apparatus for triggering a chemically augmented electrical fuse upon occurrence of a triggering event which is independent of the current through that fuse.

It is yet another object of the present invention to provide an apparatus for the coordinated triggering of fuses in a multi-phase electrical power distribution system in order to prevent single phasing.

These and other objects of the present invention are obtained by providing an apparatus for triggering chemically augmented electrical fuses, which apparatus comprises means for detecting the occurrence of a triggering event and providing an output as a result thereof; means for coupling the output from the detecting means to means for receiving the output and providing a trigger output as a result thereof; and means responsive to the trigger output for providing a triggering stimulus to the fuse.

In a preferred embodiment, the apparatus comprises a light source which emits a light signal in the form of, for example visible or infrared light energy, on receiving a signal from a control system, trigger signal sources, or other fuses. The light signal is coupled to a light detector by an optical coupling device such as a fiber optic cable. Upon receipt of the light signal, the light detector generates a signal which causes the application of electrical energy to exothermic material in the fuse, thereby detonating the material and causing interruption of the current through that fuse.

In another embodiment, the apparatus comprises a mechanical linkage connected between at least two fuses. The mechanical linkage comprises, for example, a flexible insulated rod which is mechanically connected to a transducer for converting mechanical motion into an electrical voltage such as a piezoelectric element. A shock wave created by the detonation of exothermic material in a first or triggering fuse is mechanically transmitted through the rod to a piezoelectric element in a second or triggered fuse which in turn generates an electrical signal which causes an ignitor to fire a body of exothermic material in the triggered fuse thereby interrupting current flow through the triggered fuse. Alternatively, the force from the linkage may be used to operate a mechanical switching device to open a connection in series with each fuse element thereby interrupting current flow therethrough.

In an alternate preferred embodiment of the invention, the apparatus comprises means for coupling light energy from a triggering source, for example detonation of exothermic material in a first fuse, directly to the exothermic material in a second fuse, for example by means of a fiber optic cable, thereby causing detonation of that material and interruption of the current flowing through the second fuse.

In yet another alternate preferred embodiment of the present invention, the fuses required to be operated are connected by a thermal or "pyro" fuse. The detonation of the exothermic material in a fuse positioned at one end of the thermal fuse transmits a chemical reaction down the body of the exothermic material contained in the thermal fuse to detonate a body of exothermic material in the triggered fuse positioned at the other end of the thermal fuse.

In still alternate preferred embodiment of the present invention, an electrical signal derived, for example from the recovery voltage of one fuse or the power supply of a sensing system is, utilizing isolation transformers, used to initiate exothermic material in the second fuse by means of an ignitor. The opening of this fuse is then used to initiate further fuse through a similar circuit.

Other objects, features and advantages of the present invention will be more fully apparent from the following detailed description of the preferred embodiment, the appended claims and the accompanying drawings.

DESCRIPTION OF PREFERRED EMBODIMENT

Figure 1:
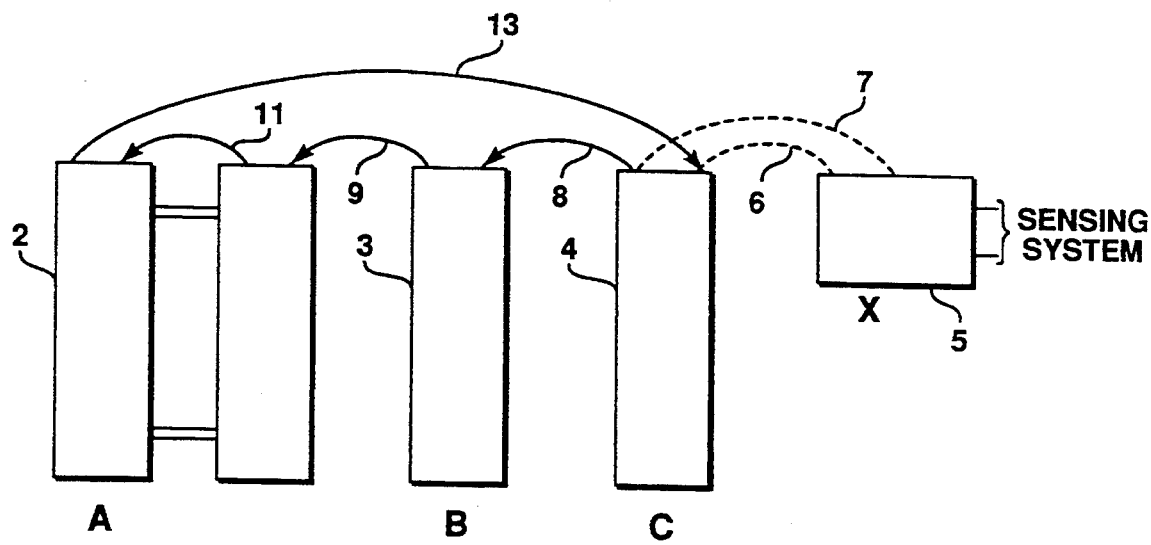
FIG. 1 is a block diagram of a generic scheme for externally triggering fuses in accordance with the present invention.

Referring to FIG. 1, there is shown a block diagram of a generic scheme for externally triggering fuses in accordance with the present invention. In the scheme depicted in FIG. 1, a three phase system has associated with it a parallel fuse 2 connected in series with phase A; a single fuse 3 connected in series with phase B; and a single fuse 4 connected in series with phase C. The scheme depicted in FIG. 1 is exemplary in that a three phase system is shown and a parallel fuse 2 is shown connected in series with phase A. Any type of multiple phase electrical power distribution system or any other system which requires coordinated firing of fuses is protectable by the apparatus of the present invention and such schemes are to be considered to be within the scope and contemplation of the present invention. Furthermore, the fuses themselves may be single fuses, parallel fuses or any other type or variation of chemically augmented electrical fuses and such fuses, when triggerable in accordance with the present invention, are also to be considered within the scope and contemplation of the present invention.

A sensor 5 senses triggering phenomena which are coupled to the sensor 5 either as a result of the triggering of fuses 2, 3 and/or 4, by means of sensing signal path 6; or from an external sensing system (not shown). The sensor 5 generates a trigger signal over path 7 to at least one of the fuses 2, 3 or 4 upon receipt of a trigger signal from the external sensing system and/or one of the fuses 2, 3 or 4. Upon receipt of a trigger signal over path 7, the fuses 2, 3 and 4 will operate. This coordinated operation is a result of triggering energy being transferred from fuse 4 to fuse 3 over path 8; from fuse 3 to one of the parallel fuses 2 through path 9; to the other of the parallel fuses 2 through path 11; and from the other of the parallel fuses back to fuse 4 through path 13.

It should be noted that if only the coordinated operation of three fuses in a three phase system is required, the sensor 5, as well as energy transfer paths 6 and 7 would not be required. For example, operation of fuse 3 due to an overcurrent in the B phase would cause operation of the parallel fuses 2 in the A phase and operation of the fuse 4 in the C phase as a result of energy transferred due to the operation of fuse 3 over energy transfer paths 9, 11 and 13. Thus, utilizing the apparatus of the present invention, the operation of any number of fuses, either within a multiple phase system or between systems, can be effected.

Figure 2:
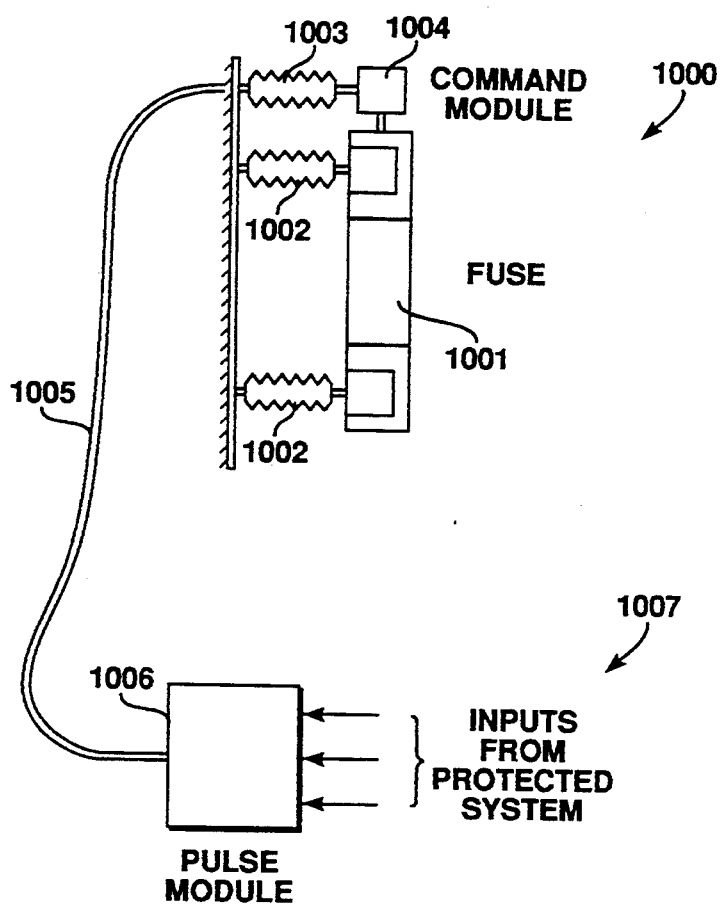
FIG. 2 is a block diagram of a generic scheme for externally triggering fuses using light signals in accordance with the present invention.
Figure 4:
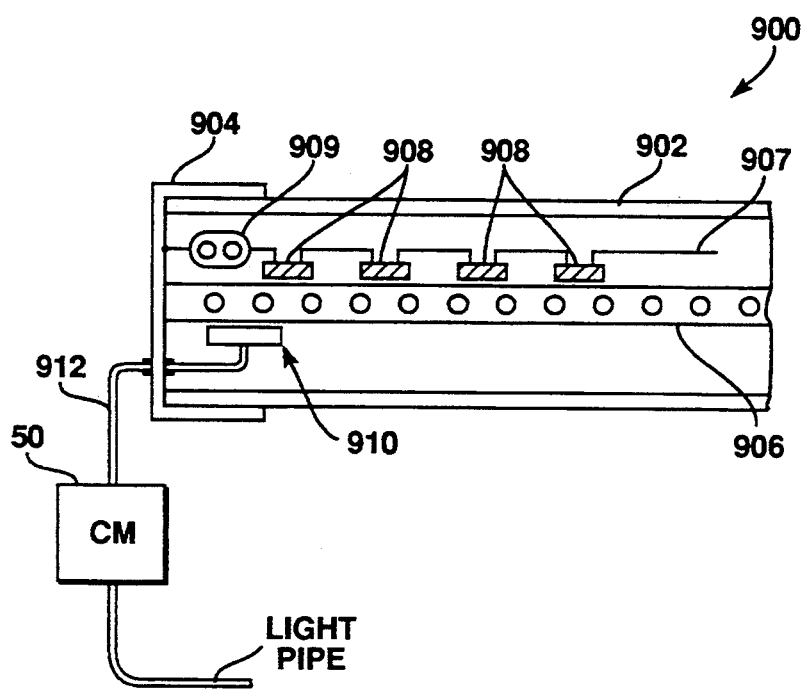
FIG. 4 is a fragmented sectional view of a preferred embodiment of the apparatus of the present of the present invention wherein coordinated triggering of fuses is initiated by electrical pulse outputs from a command module.

Referring to FIG. 2, there is shown a block diagram of a generic scheme, generally designated 1000, for externally triggering fuses using light signals in accordance with the present invention. A current limiting fuse 1001 is supported on insulators 1002. A special exothermic block, for example as shown at 910 in FIG. 4, is utilized by the current limiting fuse 1001. A command module 1004, preferably maintained at the same operating voltage as the fuse 1001, is supported on an insulator housing 1003. The command module 1004 converts light signals transmitted to it through a light pipe 1005, into electrical signals which are utilized to fire the special block. A pulse module 1006 receives inputs from the protected system 1007 and converts such inputs into light signals for onward transmission to the command module 1004 through the light pipe 1005. When the special block fires and breaks the electrical element inside the fuse 1001, the fuse interrupts and isolates the protected circuit from flow of fault currents.

Figure 3:
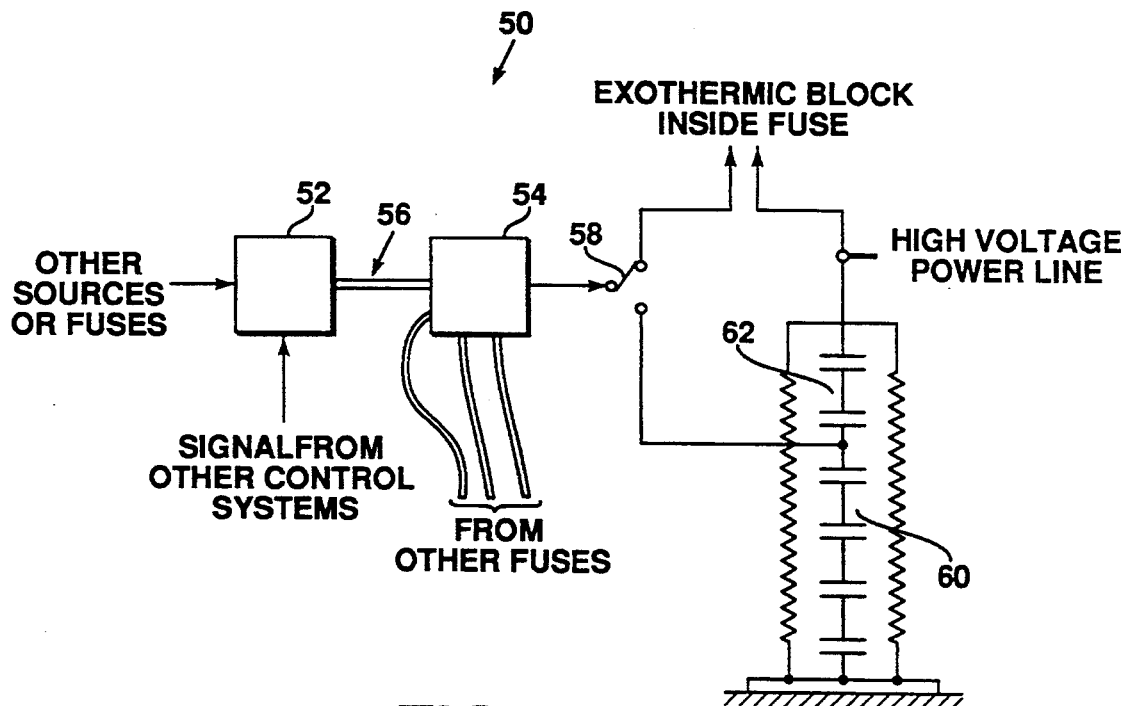
FIG. 3 is a schematic diagram of a preferred embodiment of the apparatus in accordance with the present invention employing indirect optical triggering.

Referring now to FIG. 3, there is shown a preferred embodiment of command module apparatus of the present invention, generally designated 50. The command module 50 receives light from a light source 52 which emits light upon receiving a signal from an external control system, other fuses, or other triggering sources. The light source 52 is optically coupled to a light detector 54 by means of a light transmission conduit such as a fiber optic cable 56. Upon receipt of light transmitted through the fiber optic cable 56 from the light source 52, the light detector 54 generates an electrical signal which operates a switch 58. The switch 58 can be an electronic switch which is operable by the electrical signal generated by the light detector 54.

A plurality of capacitors 60 are electrically connected in series between a power line of the power system and ground whereby the power system line voltage appears across this series connection. A first terminal of a first capacitor 62 is electrically connected to the power line. A second terminal of the capacitor 62 is electrically connected to the other series connected capacitors and to one terminal of the switch 58. The other terminal of switch 58 is electrically connected to the power line through an ignitor which is disposed in detonating relationship with a pellet of exothermic material in a chemically augmented electrical fuse of the type, for example, depicted in FIG. 4. Other types of chemically augmented fuses useable in conjunction with the command module 50 are shown and described in U.S. Pat. Nos. 4,638,283, 4,489,301, and 4,486,734; all of which are assigned to the same assignee as the present application and the teachings of which are incorporated in the present application by reference as if fully set forth herein.

Figure 9:
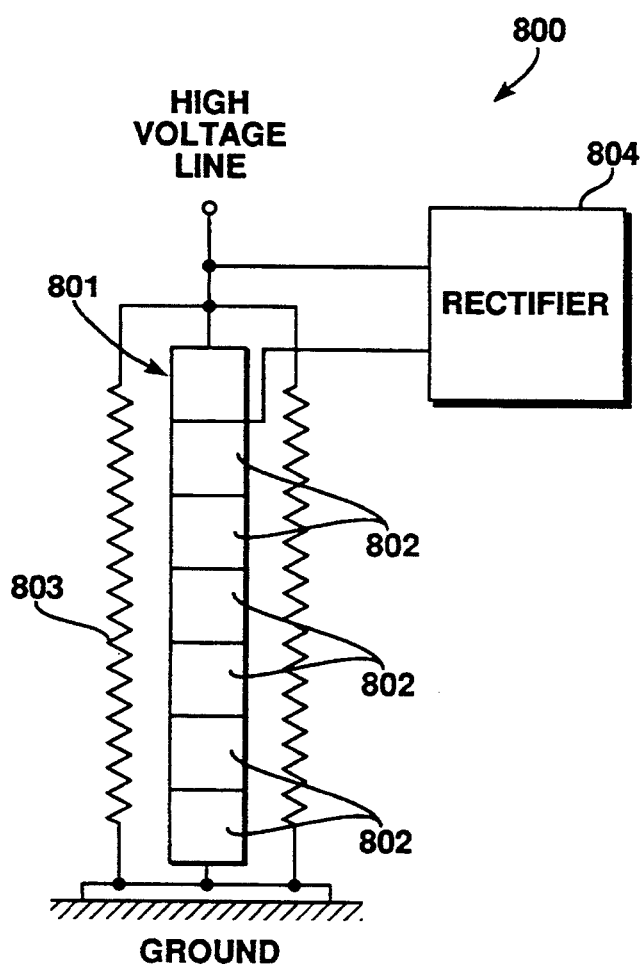
FIG. 9 is a diagrammatic view of an alternate embodiment of a power source for providing a trigger signal in accordance with the present invention.

In some applications the trigger signal power source is required at the high voltage terminal since the fuse itself is insulated for system voltage. Referring to FIG. 9, there is shown an alternate embodiment of a trigger signal power source generally designated 800 which meets such a requirement. The trigger signal power source 800 comprises a voltage divider 801 connected across the system line from the high voltage side to ground. In the preferred embodiment, the voltage divider 801 comprises a plurality of arrestor blocks 802 connected in series. The arrester blocks 802 are preferably metal oxide surge arrester blocks. A rectifier 804 is connected across the top arrester block 802 at the high voltage end. The output at the terminals of the rectifier 804 is a DC voltage. A first terminal of the rectifier 804 is electrically connected to an ignitor which is disposed in detonating relationship with a pellet of exothermic material in a chemically augmented electrical fuse of the type, for example, depicted in FIG. 4. A second terminal of the rectifier 804 is connected to one terminal of the switch 58 (see FIG. 3).

The fuse depicted in FIG. 4, generally designated 900, comprises an electrically non-conductive fuse body 902 which is enclosed at each end by electrically conductive end caps 904 (only one shown in FIG. 4). An electrically conductive fuse element 906 extends between and is electrically connected to the end caps 904. The fuse element 906 conducts the current through the fuse 900 between the end caps 904. Blocks of exothermic material 908 are attached to the fuse element 906 at spaced intervals. A trigger circuit 907 comprises the exothermic blocks 908 electrically connected in series with an air gap 909. The trigger circuit 907 is electrically connected between the end caps 904. An externally triggered block of exothermic material 910 is disposed adjacent the fuse element 906, toward one end of the element 906 in the preferred embodiment depicted in FIG. 4. In the preferred embodiment, the block of exothermic material 910 is attached to the fuse element 906. The electrical pulse output of the command module 50 (see FIG. 3) is electrically connected to the externally triggered block of exothermic material 910 by means of electrical conductors 912.

The apparatus 50 operates as follows. The light source 52 emits light upon receiving a signal from, for example, a fuse connected in series with another phase in a three-phase electrical power system. The light output from the light source 52 is coupled to the light detector 54 by the fiber optic cable 56. Upon receipt of the light output from the light source 52, the light detector 54 generates an electrical signal which closes the switch 58. Closing of the switch 58 applies the electrical energy stored in the first capacitor 62 to the ignitor disposed in detonating relationship with the pellet of exothermic material in the fuse to be triggered. The application of this electrical energy causes the ignitor to detonate the pellet thereby effecting the operation of the fuse and concomitant interruption of current flow in the fused circuit.

In the case of the fuse embodiment 900 depicted in FIG. 4, the electrical energy stored in the first capacitor 62 is coupled to the block of exothermic material 910 by means of the electrical conductors 912. Application of this electrical energy to the block of exothermic material 910 causes the block 910 to detonate thereby causing a break in the current carrying element 906. The break in the current carrying element 906 causes arcing across the air gap 909 thereby causing current to flow through the trigger circuit 907 which effects the detonation of at least one and preferably all of the exothermic blocks 908. Detonation of the exothermic blocks 908 assures additional breaks in the element 906 and, accordingly, total, rapid interruption of the current through the element 906 of the fuse 900.

Utilizing the alternate embodiment trigger signal power source 800 depicted in FIG. 9, closing of the switch 58 of the command module 50 applies the DC voltage output from the rectifier 804 across the pellet of exothermic material in the fuse to be triggered. Application of this voltage causes the ignitor to detonate the pellet thereby effecting the operation of the fuse and concomitant interruption of current flow in the fused circuit. This alternate embodiment trigger signal power source 800 not only achieves the goal of providing a trigger signal power source at the fuse end insulated for the system high voltage, it has the added the advantage of providing lightning protection to the system at the fused location and also eliminates the extra surge protection required for these fuses.

Figure 5:
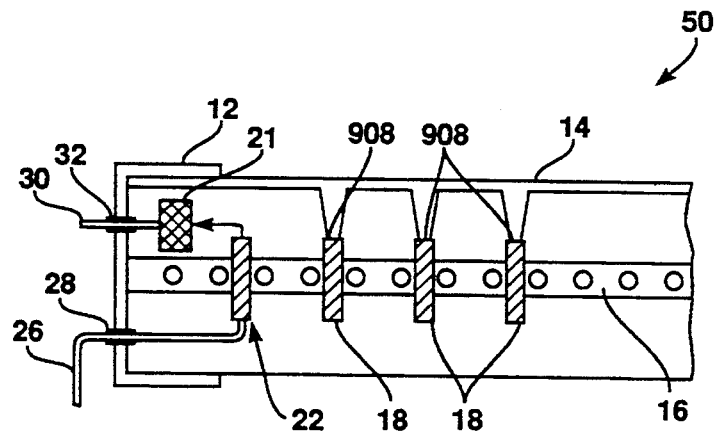
FIG. 5 is a diagrammatic view of a chemically augmented electrical fuse which is triggerable in accordance with the present invention.

Referring now to FIG. 5, there is shown a chemically augmented electrical fuse, generally designated 10. The fuse 10 comprises a pair of electrically conductive end caps 12 (only one is shown in FIG. 5) disposed at the ends of an electrically insulating housing 14. At least one current carrying element 16 is electrically connected between the end caps 12.

Pellets of exothermic material 18 are attached to the current carrying element 16 at spaced locations along the element 16. A trigger circuit 20 is electrically connected between the end caps 12 and is attached to the pellets 18. Upon the occurrence of a break in the element 16, electrical current through the trigger circuit 20 will increase thereby causing the detonation of the pellets of exothermic material 18 as is shown for example in U.S. Pat. Nos. 4,638,283; and 4,489,301, all of which are assigned to the same assignee of the present invention, and all of which are herein incorporated by reference. An externally triggered pellet of exothermic material 22 is attached to the current carrying element 16. A triggering energy source pellet of exothermic material 24 is disposed within the housing 14 in proximity to the externally triggered pellet 22. The pellets 22 and 24 are positioned, with respect to each other, such that detonation of pellet 22 will cause the detonation of pellet 24.

A first energy transfer path, for example a light transmission conduit, such as a first fiber optic cable 26, passes through a first aperture 28 in the end cap 12. One end of the first fiber optic cable 26 is disposed adjacently externally triggered pellet 22. A second energy transfer path, for example a light transmission conduit such as a second fiber optic cable 30, is disposed through a second aperture 32 in the end cap 12. A first end of the second fiber optic cable 30 is disposed adjacent the triggering energy source power 24.

The chemically augmented electrical fuse 10 is triggered as follows. Energy in the form of visible or infrared radiation, for example that which is generated by the detonation of exothermic material in another chemically augmented electrical fuse, is coupled to the externally triggered pellet 22 by the first fiber optic cable 26. Due to the proximity of the end of the first fiber optic cable 26 and the pellet 22, light energy exiting the end of the first fiber optic cable 26 will cause the detonation of the pellet 22. Detonation of the pellet 22 will cause the detonation of the triggering energy source pellet 24 in addition to causing a break in the current carrying element 16. The break in the element 16 caused by the externally triggered pellet 22 effects the operation of trigger circuit 20 which then detonates the pellets 18 causing additional multiple breaks in the current carrying element 16 in order to insure interruption of current flow in the protected circuit.

Detonation of the triggering energy source pellet 24 generates energy in the form of visible or infrared radiation which is coupled to at least one other device, such as one or more other chemically augmented electrical fuses 10, thereby causing the detonation of the externally triggered pellets 22 in those fuses in a manner which is identical to that described above. Thus, in accordance with the present invention, operation of one fuse in a three-phase power system will cause the operation of the optically interconnected fuses on the other two phases, thereby preventing single-phasing of the system.

Figure 6:
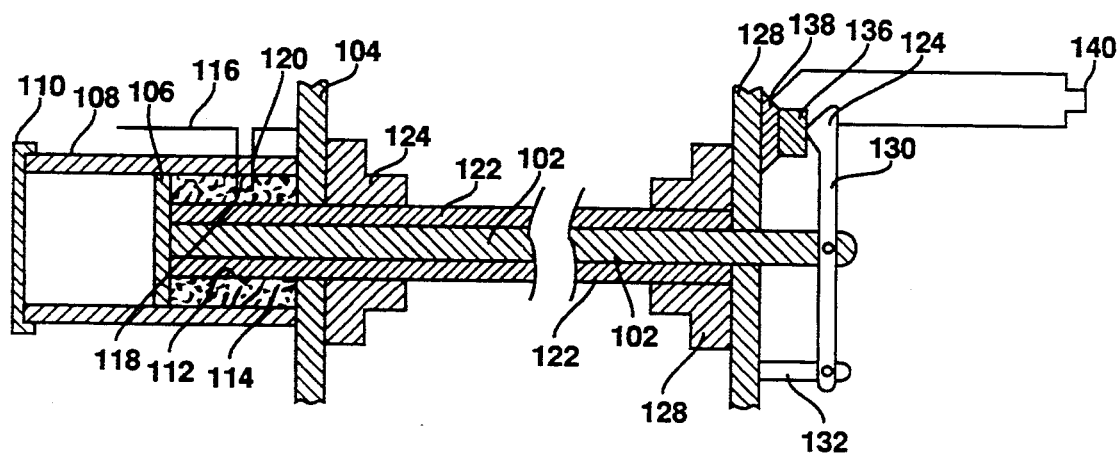
FIG. 6 is a fragmented sectional view of a preferred embodiment of the apparatus of the present invention wherein coordinated triggering of fuses is initiated electromechanically.

Referring now to FIG. 6 there is shown a fragmented sectional view of a preferred embodiment of the apparatus of the present invention wherein coordinated triggering of fuses is initiated electromechanically. A flexible rod 102 passes through an aperture in an end cap 104 of a chemically augmented fuse. If the fuses to which the rod 102 is connected are at different potentials, the rod 102 must be non-conducting. In addition, although it is preferred that the rod 102 be flexible, a stiff rod may also be used and as such is to be considered within the scope of the present invention. One end of the rod 102 is connected to a plunger 106 which is slidably mounted within a housing 108. One end of the housing 108 is connected to the end cap 104. The other end of the housing 108 is covered by a protective dust cap 110. It is preferred that the protective dust cap 110 be porous with the pores small enough to keep dust, sand and other debris out of the housing 108.

A sleeve 112 surrounds that portion of the rod 102 between the end cap 104 and plunger 106. It is preferred that the sleeve 112 be metal or a thermally insulating material in order to protect the rod 102 from the effects caused by detonation of explosive material 114 which is disposed within the housing 108 around the sleeve 112 between the plunger 106 and the end cap 104. Electrical conductors 116 are electrically conducted to an igniter 118 through a port 120 in the housing 108. An insulated sleeve 122 is disposed around the rod 102 external to the end cap 104. One end of the insulated sleeve 122 is fastened to the end cap 104 by means of a fastening collar 124.

The other end of the rod 102 passes through an end cap 126 of a second or triggered fuse. The other end of the insulated flexible sleeve 122 is fastened to the end cap 126 by means of a second fastening collar 128. The other end of the rod 102 is pivotally connected to a striker bar 130. One end of the striker bar 130 is pivotally connected to a base support 132 which is fastened to the end cap 126 of the triggered fuse. The other end of the striker bar 130 comprises a striking head 134 which is located adjacent a piezoelectric crystal 136.

The piezoelectric crystal 136 is mounted on a base 138 which is connected to the end cap 126 of the triggered fuse. One terminal of an igniter 140 is electrically connected to the base 138. The other terminal of the igniter 140 is electrically connected to the striker head 134 of the striker bar 130. The igniter 140 is positioned in the triggered fuse whereby ignition of the igniter 140 causes detonation of a pellet of exothermic material (for example a pellet such as pellet 22 in FIG. 3) which in turn causes a break in the current carrying element of the triggered fuse (for example a current carrying element such as element 16 in FIG. 5) which in turn causes the triggering of other exothermic pellets (for example pellets such as pellets 18 in FIG. 5) to ensure a break in the current carrying element and therefore an interruption of the current flowing through the fuse.

The embodiment of the present invention depicted in FIG. 6 operates as follows. Upon ignition of the igniter 118 in the triggering fuse, the ignition of which may be causes either by an overcurrent condition in the triggering fuse or by a triggering signal which is generated external to the triggering fuse, the explosive material 114 in the housing 108 will detonate. This causes the sleeve 106 to slide within the housing 108 in a direction towards the end cap 110. Since the sleeve 106 is connected to one end of the rod 102, the movement of the sleeve 106 will cause a corresponding movement of the rod 102. Movement of the rod 102 will cause the striking head 134 of the striking rod 130 to exert a mechanical force on the piezoelectric crystal 136. Exertion of a mechanical force on the piezoelectric crystal 136 will cause the generation of an electrical current through the igniter 140 which in turn will cause the igniter 140 to ignite and detonate the explosive pellet in the triggered fuse. Detonation of the triggered pellet will cause the triggered fuse to operate as previously explained with respect to FIG. 5. It should be noted that the triggered fuse may also be constructed in accordance with the present invention whereby the operation of the triggered fuse will cause the operation of another triggered fuse by means of another flexible insulated rod.

Figure 7:
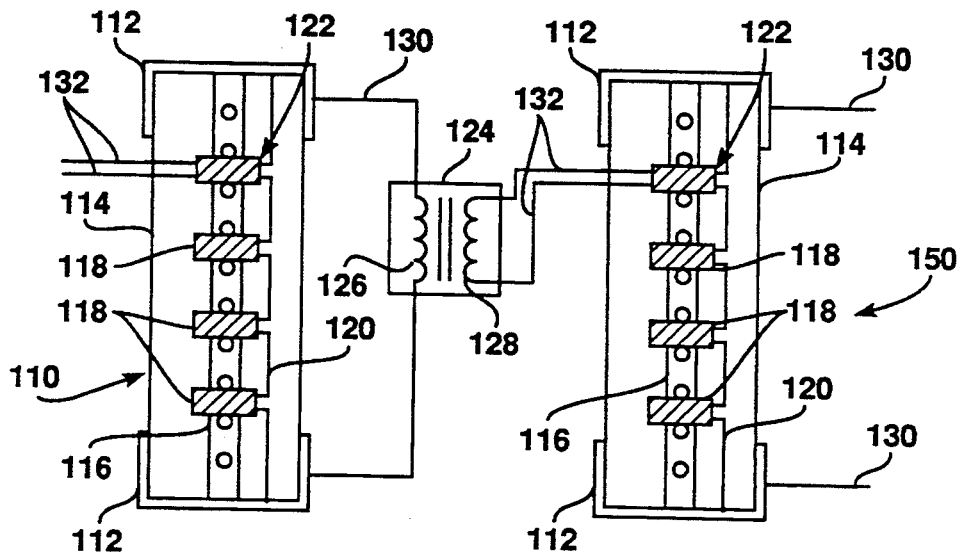
FIG. 7 is a schematic diagram of an alternate preferred embodiment of the apparatus of the present invention wherein coordinated triggering of fuses is initiated electrically.

Referring now to FIG. 7, there is shown a schematic diagram of an alternate preferred embodiment of the apparatus of the present invention wherein coordinated triggering of fuses is initiated electrically. It should be noted that although only two fuses are shown for purposes of clarity in this detailed description, typically three fuses, one for each phase, are utilized in coordinated current interruption schemes. A first chemically augmented electrical fuse, generally designated 110, comprises a pair of electrically conductive end caps 112 disposed at the ends of an electrically insulated housing 114. At least one current carrying element 216 is electrically connected between the end caps 112.

Pellets of exothermic material 118 are attached to the current carrying element 116 at spaced locations along the element 116. A trigger circuit 120 is electrically connected between the end caps 112 and is attached to the pellets 118. Upon occurrence of a break in the element 116, electrical current through the trigger circuit 120 will increase thereby causing the detonation of the pellets of exothermic material 118 as is shown for example in the above-referenced U.S. patents. An externally triggered pellet 122 of exothermic material is attached to the current carrying element 116. A second chemically augmented electrical fuse 150 comprises the same components as described with respect to the first fuse 110 and corresponding components of the second fuse 150 are identified by the same reference numerals as those in the first fuse 110 as set forth in the detailed description above.

An isolation transformer 124 has a primary winding 126 and a secondary winding 128. The primary winding 126 is electrically connected between the end caps 112 of the first fuse 110 by means of, for example, a pair of sensing leads 130. The secondary winding 128 of the isolation transformer 112 is electrically connected to the triggering energy source pellet 122 of the second fuse 150 by, for example, a pair of signal leads 132.

The embodiment depicted in FIG. 7, operates as follows. Upon occurrence of a break in the current carrying element 116 of the first fuse 110, the voltage between end caps 112 will suddenly increase. This sudden increase in voltage will be coupled to the primary coil 126 of the isolation transformer 124 by means of the sensing leads 130. As a result, a sudden increase voltage will appear at the secondary winding 128 of the isolation transformer 124 which in turn will be coupled to the externally triggered pellets 122 in the second fuse 150 by means of the signal leads 132.

Application of this sudden increase in voltage to the externally triggered pellet 122 of the second fuse 150 will cause the pellet 122 to detonate. Detonation of pellet 122 will in turn cause detonation of pellets 118 to ensure that the current carrying element 116 of the second fuse 150 is broken thereby interrupting current flow through the second fuse 150. Note that interruption of the current through the second fuse 150 would cause a sudden increase in voltage between its end caps 112 which voltage increase could be coupled to the primary winding of another isolation transformer (not shown) through the sensing leads 130 of the second fuse 150. The secondary winding of that transformer could be coupled to an externally triggered pellet of another fuse (not shown).

It should also be noted that the externally triggered pellet 122 of the first fuse 112 is electrically connected to the secondary winding of an isolation transformer (not shown), the primary of which is connected to another fuse (also not shown). Should the current carrying element of the other fuse break causing the interruption of current through that fuse, the resultant sudden rise in voltage between the end caps of that fuse would be coupled by the isolation transformer to the externally triggered pellet 122 of the first fuse causing that pellet to detonate and the first fuse to operate in the manner described above.

As can be seen by reference to FIG. 7, by use of the isolation transformer 124, an electrical signal derived from the recovery voltage of one fuse or the power supply (not shown) of a sensing system could be used to initiate exothermic material in the second or triggered fuse by means of a suitable igniter. The opening of the triggered fuse could then be used to initiate an operation of a further fuse through a similar circuit. As can be also seen from FIG. 7, the circuit is designed to ensure that the small resistive voltage drop across an unblown fuse is not sufficient to initiate the sequence.

Figure 8:
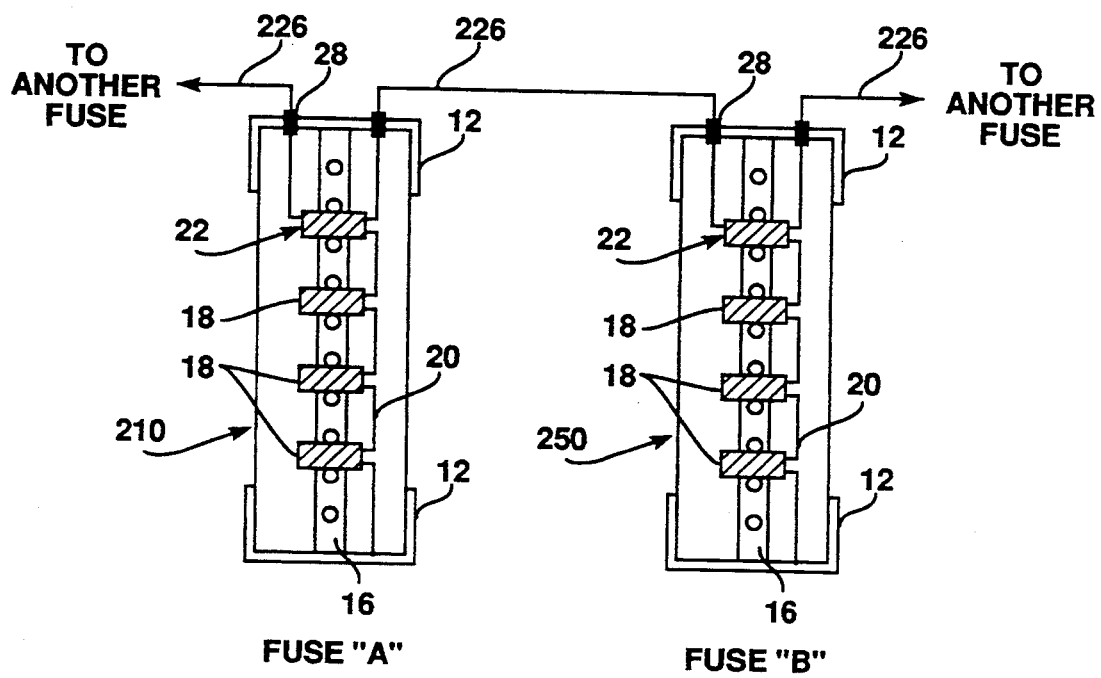
FIG. 8 is a diagrammatic view of another alternate preferred embodiment of the apparatus of the present invention wherein coordinated triggering of fuses is initiated thermally.

Referring now to FIG. 8, there is shown a diagram of another alternate preferred embodiment of the apparatus of the present invention wherein coordinated triggering of the fuses is initiated thermally. A first fuse, generally designated 210, which is constructed in accordance with the fuse depicted in FIG. 5 is coupled by means of a thermal energy transfer path 226 to a second fuse generally designated 250, which is also constructed in accordance with the fuse depicted in FIG. 5. Those components of fuses depicted in FIG. 8 which correspond to the components depicted in FIG. 5 are identified with the same reference numerals. In the preferred embodiment, the thermal energy transfer path 226 is a thermal or "pyro" fuse. One end of the thermal or "pyro" fuse 226 passes through a first aperture 228 in the end cap 12 of the first fuse 210. The end of the thermal or "pyro" fuse is positioned in proximity to the externally triggered pellet 22 of the first fuse 210. The other end of the thermal or "pyro" fuse 226 extends through a first aperture 228 in the second fuse 250 and is positioned in proximity to the externally triggered pellet 22 of the second fuse 250.

The thermally triggered fuses depicted in FIG. 8 operate as follows. Upon the occurrence of a break in the element 16 of the first fuse 210, the electrical current through the trigger circuit 20 will increase thereby causing pellets 18 of exothermic material as shown for example in the above-referenced U.S. patents. Since the externally triggered pellet 22 is also connected to the trigger circuit 20, it will likewise detonate.

Detonation of the externally triggered pellet 22 will cause initiation of an exothermic chemical reaction (detonation) of the thermal or "pyro" fuse at the end which is deposed in proximity to the externally triggered pellet 22. This exothermic chemical reaction will be propagated down the body of the thermal or "pyro" fuse 226 to its other end. Since the other end of the thermal or "pyro" fuse 226 is in proximity to the externally triggered pellet 22 in the second fuse 250, it will cause detonation of the pellet 22 which in turn will cause detonation of the exothermic pellets 18 and a break in the current carrying element 16. Detonation of the externally triggered pellet 22 in the second fuse 250 will initiate an exothermic chemical reaction through the thermal or "pyro" fuse 226 which is connected to another fuse (not shown). It should be noted that the operation of the first fuse 210 can be initiated by receipt of an exothermic chemical reaction through the thermal or "pyro" fuse 226 which is coupled to another fuse (not shown).

As can be seen by reference to FIG. 8, the operation of exothermic material at one end of the thermal fuse transmits a chemical reaction down the body of exothermic material contained in the tube to ignite the body of exothermic material in the second fuse. If the fuses are at different potentials, the exothermic material must be non-conducting or must incorporate insulated breaks which will break down upon the exothermic reaction. The products of the exothermic reaction are also required to be non-conducting in this situation.

As can be seen from the above detailed description, the apparatus of the present invention for triggering chemically augmented electrical fuses, provides rapid, synchronous triggering of fuses in a multi-phase electrical power system, thereby preventing single phasing. Such fuses can be located in proximity of one another or can be remote from one another, depending upon the application. Such fuses can also be triggered by external events which may include, by way of example, abnormal conditions such as hot oil in a transformer, high pressure inside a transformer tank, or the failure of a secondary protective device such as a circuit breaker or other fuses. The fuses may also be triggered by external control systems as required to protect the overall power distribution system.

It will be understood that various changes in the details, materials and arrangement of the part which have been described and illustrated in order to explain the nature of this invention, may be made by those skilled in the art without departing from the principle and scope of the invention as expressed in the following claims.

What is claimed is:

1. An apparatus for triggering a chemically augmented electrical fuse, said apparatus comprising:
   (a) means for detecting the occurrence of a triggering event and providing an output as a result thereof, said detecting means comprising means for converting an electrical signal into mechanical motion;
   (b) means for receiving said output and providing a trigger output as a result thereof;
   (c) means for coupling said output from said detecting means to said receiving means and for providing electrical isolation between said detecting means and said receiving means, said coupling means comprising an electrically insulating rod, one end of which is attached to said converting means; and
   (d) means responsive to said trigger output for applying a triggering stimulus to said fuse.

2. The apparatus in accordance with claim 1 wherein said means for converting an electrical signal into mechanical motion comprises:

(a) a housing, a first end of which is sealably attached to an end cap of a fuse;
(b) a plunger slidably disposed within said housing;
(c) exothermic material disposed within said housing between said plunger and said end cap; and
(d) an igniter disposed in detonating relationship with said exothermic material.

3. The apparatus in accordance with claim 2 wherein one end of said rod is attached to said plunger.

4. The apparatus in accordance with claim 3 wherein said receiving means comprises a transducer, mechanically coupled to said rod, for converting mechanical motion to an electrical voltage.

5. The apparatus in accordance with claim 4 wherein said rod is flexible.

6. The apparatus in accordance with claim 5 wherein said flexible rod is constructed of an electrically insulating material.

7. The apparatus in accordance with claim 4 wherein said transducer comprises a piezoelectric crystal.

8. The apparatus in accordance with claim 7 wherein said means responsive to said trigger output comprises an igniter disposed in detonating relationship with explosive material contained in a triggered fuse.

9. An apparatus for effecting the coordinated interruption of electrical currents flowing in at least two phases of a multiphase electrical power distribution system, said apparatus comprising:
(a) at least two chemically augmented electrical fuses, each fuse adapted for electrical connection in series with an associated phase of said multiphase electrical power distribution system for interrupting current flowing in that phase when either the current flowing in that phase exceeds a predetermined maximum for a predetermined period of time or upon receipt of a triggering stimulus;
(b) a sensor for detecting the occurrence of a triggering event and providing an output as a result thereof;
(c) means for receiving the output of said sensor and providing a trigger output as a result thereof;
(d) means, responsive to said trigger output, for applying a triggering stimulus to fuses associated with phases of said multiphase electrical power distribution system.

10. The apparatus in accordance with claim 9 wherein said sensor comprises a pellet of exothermic material disposed in igniting relationship with a second pellet of exothermic material.

11. The apparatus in accordance with claim 10 wherein said output receiving means comprises said second pellet of exothermic material.

12. The apparatus in accordance with claim 11 wherein said coupling means comprises a fiber optic cable, a first end of which is disposed adjacent said first pellet of exothermic material disposed in a triggering fuse; and the second end of which is disposed adjacent said second pellet of exothermic material disposed in a triggered fuse.

13. The apparatus in accordance with claim 11 wherein said coupling means comprises a thermal energy transfer path.

14. The apparatus in accordance with claim 13 wherein said thermal energy transfer path comprises a pyrotechnic fuse.

15. The apparatus in accordance with claim 9 wherein said sensor comprises means for generating light energy in response to an electrical signal.

16. The apparatus in accordance with claim 15 wherein said receiving means comprises means for generating an electrical signal in response to receipt of light energy.

17. The apparatus in accordance with claim 16 wherein said coupling means comprises a fiber optic cable.

18. The apparatus in accordance with claim 17 wherein said trigger stimulus application means comprises:
i) means for storing electrical energy; and
ii) means for applying electrical energy stored in said electrical energy storage means to a pellet of exothermic material.

19. The apparatus in accordance with claim 18 wherein said electrical energy storage means comprises a capacitor.

20. The apparatus in accordance with claim 19 wherein said means for applying said stored electrical energy comprises an electrically operated switch.

21. The apparatus in accordance with claim 17 where in said trigger stimulus application means comprises:
i) means for providing an electrical power source, a first terminal of which is at a first voltage of magnitude substantially equal to that of the voltage of the system employing said triggerable chemically augmented electrical fuse, and a second terminal having a voltage of a magnitude which is lower than the magnitude of said first voltage, such that the voltage across the first and second terminals has a predetermined magnitude which is substantially less than the magnitude of the system voltage.

22. The apparatus in accordance with claim 21 wherein said trigger signal power source comprises:
a) a voltage divider connected in series across a system line and ground; and
b) rectifier means connected across a portion of said voltage divider at the system voltage end thereof.

23. The apparatus in accordance with claim 22 wherein said voltage divider comprises at least two arrester blocks connected in series.

24. The apparatus in accordance with claim 23 wherein the rectifier means is connected across the arrester block at the system voltage end of said series connected blocks.

25. The apparatus in accordance with claim 24 wherein said arrester blocks comprise metal oxide surge arrester blocks.

26. The apparatus in accordance with claim 9 wherein said sensor comprises means for detecting a voltage increase across a triggering fuse.

27. The apparatus in accordance with claim 26 wherein said output receiving means comprises a pellet of exothermic material disposed in igniting relationship with a second pellet of exothermic material in a triggered fuse.

28. The apparatus in accordance with claim 27 wherein said coupling means and said stimulus application means comprises a transformer.

29. The apparatus in accordance with claim 9 wherein said detecting means comprises means for converting an electrical signal into mechanical motion.

30. The apparatus in accordance with claim 29 wherein said means for converting an electrical signal into mechanical motion comprises:
(a) a housing, a first end of which is sealably attached to an end cap of a fuse;
(b) a plunger slidably disposed within said housing;

(c) exothermic material disposed within said housing between said plunger and said end cap; and (d) an igniter disposed in detonating relationship with said exothermic material.

31. The apparatus in accordance with claim 30 wherein said coupling means comprises a rod, one end of which is attached to said plunger.

32. The apparatus in accordance with claim 31 wherein said receiving means comprises a transducer, mechanically coupled to said rod, for converting mechanical motion to an electrical voltage.

33. The apparatus in accordance with claim 32 wherein said rod is flexible.

34. The apparatus in accordance with claim 33 wherein said flexible rod is constructed of an electrically insulating material.

35. The apparatus in accordance with claim 32 wherein said transducer comprises a piezoelectric crystal.

36. The apparatus in accordance with claim 35 wherein said means responsive to said trigger output comprises an igniter disposed in detonating relationship with explosive materials contained in a triggered fuse.

37. The apparatus in accordance with claim 9 wherein said triggering event comprises cooling fluid within a transformer having a temperature which exceeds a predetermined limit.

38. The apparatus in accordance with claim 9 wherein said triggering event comprises pressure inside a transformer tank which exceeds a predetermined limit.

* * * * *